United States Patent
Bertram et al.

(10) Patent No.: US 11,796,360 B2
(45) Date of Patent: Oct. 24, 2023

(54) TRANSDUCER HOLDING DEVICE FOR AN ULTRASONIC FLOW MEASUREMENT DEVICE

(71) Applicant: Sensus Spectrum LLC, Morrisville, NC (US)

(72) Inventors: Carsten Bertram, Hannover (DE); Andreas Pfeiffer, Hannover (DE)

(73) Assignee: Sensus Spectrum LLC, Morrisville, NC (US)

( * ) Notice: Subject to any disclaimer, the term of this patent is extended or adjusted under 35 U.S.C. 154(b) by 264 days.

(21) Appl. No.: 17/287,335

(22) PCT Filed: Oct. 21, 2019

(86) PCT No.: PCT/EP2019/078484
§ 371 (c)(1),
(2) Date: Apr. 21, 2021

(87) PCT Pub. No.: WO2020/083805
PCT Pub. Date: Apr. 30, 2020

(65) Prior Publication Data
US 2021/0356303 A1    Nov. 18, 2021

(30) Foreign Application Priority Data
Oct. 25, 2018  (DE) .......................... 102018126613.8

(51) Int. Cl.
*G01F 1/66*     (2022.01)
*G01F 1/667*    (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 3,964,308 A | * | 6/1976 | Scarpa ...................... | G01F 1/66 73/861.27 |
| 5,179,862 A | * | 1/1993 | Lynnworth ............. | G01F 1/662 73/861.28 |
| 5,515,733 A | * | 5/1996 | Lynnworth ............ | G01N 29/02 73/644 |

(Continued)

FOREIGN PATENT DOCUMENTS

| | | |
|---|---|---|
| DE | 2461403 | 7/1976 |
| DE | 202013101798 | 7/2014 |

(Continued)

*Primary Examiner* — Harshad R Patel
(74) *Attorney, Agent, or Firm* — McHale & Slavin, P.A.

(57) ABSTRACT

A measuring device for determining the flow rate of a fluid which flows through a pipe portion. The measuring device comprises a measuring pipe with a pipe wall, at least one ultrasonic sensor for transmitting an acoustic signal and/or receiving an acoustic signal having an ultrasonic sensor upper surface and a holding element. In the pipe wall, at least one opening of a first type is provided, into which the at least one ultrasonic sensor can be inserted, and wherein the measuring device has an assembled state in which the holding element surrounds the measuring pipe in an annular manner and is positioned on the at least one ultrasonic sensor inserted into the opening of a first type.

18 Claims, 4 Drawing Sheets

(56) References Cited

U.S. PATENT DOCUMENTS

| | | | | |
|---|---|---|---|---|
| 5,583,300 | A * | 12/1996 | Green | G01F 1/3259 73/861.24 |
| 7,703,337 | B1 * | 4/2010 | Feller | G01F 1/662 73/861.27 |
| 8,424,392 | B2 * | 4/2013 | Kroemer | G01F 1/662 73/861.18 |
| 2007/0227262 | A1 * | 10/2007 | Molenaar | G01F 1/662 73/861.12 |
| 2008/0236296 | A1 * | 10/2008 | Sonnenberg | G01F 1/662 73/861.26 |
| 2014/0216167 | A1 * | 8/2014 | Nielsen | G01F 1/66 73/861.28 |
| 2015/0143919 | A1 * | 5/2015 | Nakano | G01F 1/662 73/861.28 |

FOREIGN PATENT DOCUMENTS

| | | |
|---|---|---|
| DE | 102014109772 | 9/2015 |
| EP | 0036658 | 9/1981 |
| EP | 1967828 | 9/2008 |
| EP | 2236994 | 10/2010 |
| EP | 2386836 | 11/2011 |

* cited by examiner

TRANSDUCER HOLDING DEVICE FOR AN ULTRASONIC FLOW MEASUREMENT DEVICE

CROSS REFERENCE TO RELATED APPLICATIONS

This is a national stage filing in accordance with 35 U.S.C. § 371 of PCT/EP2019/078484, filed Oct. 21, 2019, which claims the benefit of the priority of German Patent Application No. 102018126613.8, filed Oct. 25, 2018, the contents of each are incorporated herein by reference.

TECHNICAL FIELD

The present invention relates to a measuring device for determining the flow rate of a fluid which flows through a pipe portion. In particular, the present invention relates to a measuring device for determining the flow rate of a fluid which flows through a pipe portion by means of ultrasonic sensors according to the time of flight difference method.

STATE OF THE ART

When determining the flow rate of a fluid which flows through a pipe portion by means of ultrasonic sensors using the time of flight difference method, acoustic signals are coupled into a measuring pipe by means of an ultrasonic sensor. An ultrasonic receiver picks up the signal at the end of a predetermined path of the signal. The flow rate of a fluid which flows through the measuring pipe can be determined from the measured transit time of the signal compared to a measured transit time of a signal in a state in which the fluid in the measuring pipe is not flowing, if the measuring pipe geometry is known.

There are basically two ways of arranging the ultrasonic sensors on the measuring pipe. On the one hand, there are measuring devices in which the ultrasonic sensor is attached to the outside of the measuring pipe. These so-called clamp-on measuring devices are comparatively easy to implement in terms of construction, but they have the disadvantage that the ultrasound must be guided through the pipe wall of the measuring pipe, which generally leads to a weakening of the measuring signal.

In another structure of a measuring device, openings are provided in the pipe wall of the measuring pipe and in said openings the ultrasonic sensors are arranged such that the sound does not have to be coupled into the fluid through the pipe wall. This type of measuring device provides very good measurement results, but is much more demanding with respect to the measuring device as such, in particular regarding the ultrasonic sensor and the installation of the ultrasonic sensor in the measuring pipe. Thus, there are special challenges with regard to the leak-tightness of the measuring device. The ultrasonic sensor is directly exposed to the influences of the fluid which flows in the measuring pipe. In addition to the fact that the ultrasonic sensor comes into contact with the fluid, said ultrasonic sensor is also subjected to fluctuations in pressure and temperature caused by the fluid.

In case the ultrasonic sensor is inserted into the opening provided in the measuring pipe in a fluid-tight manner, there is the risk that the ultrasonic sensor is pressed outward by a pressurized fluid in the measuring pipe. As the ultrasonic sensor then no longer sits in the intended position, this leads to incorrect measurement results.

To securely hold ultrasonic sensors in the measuring pipe, the ultrasonic sensors are often provided with a threaded fitting and screwed into a threaded opening in the measuring pipe.

It has been found that with this type of fastening, stresses in the measuring pipe and/or temperature and pressure fluctuations of the fluid are transmitted to the ultrasonic sensor, which can lead to undesirable deviations in measurement results. In addition, screw connections are less suitable when using powder-coated measuring pipes, as the powder coating could be damaged when the ultrasonic sensor is screwed into the opening of the measuring pipe, which subsequently leads to a susceptibility to corrosion at the attachment points. This applies especially to measuring devices used in humid ambient conditions such as in open terrain.

Furthermore, attempts have been made to insert the ultrasonic sensor into corresponding openings provided in the measuring pipe in such a way that a pressurized fluid in the measuring pipe does not press the ultrasonic sensor outward. However, this is not easy to implement, since care must be taken during installation of the ultrasonic sensor to ensure that the ultrasonic sensor, in particular the coupling element, is mounted stress-free. Compression of the coupling element influences the acoustic properties of the coupling element and, ultimately, even damages the coupling element or ultrasonic sensor.

DESCRIPTION OF THE INVENTION

It is the object of the present invention to provide a measuring device for determining the flow rate of a fluid which flows through a pipe portion by means of ultrasonic sensors according to the time of flight difference method, in which the ultrasonic sensors are securely fixed in the opening of a measuring pipe and are preferably not exposed to any external forces that may damage the ultrasonic sensor, and in which, as far as possible, no corrosion occurs on the measuring pipe in humid ambient conditions.

According to the invention, the object is solved by a measuring device for determining the flow rate of a fluid which flows through a pipe portion, comprising a measuring pipe with a pipe wall, at least one ultrasonic sensor for transmitting an acoustic signal and/or receiving an acoustic signal and a holding element, wherein in the pipe wall at least one opening of a first type is provided, into which the at least one ultrasonic sensor can be inserted, and wherein the measuring device has an assembled state, in which the holding element surrounds the measuring pipe in an annular manner and is positioned on the outside of the at least one ultrasonic sensor inserted in the opening of a first type.

Herein, the ultrasonic sensor can be inserted into the opening by plugging-in, screwing-in or any other way of fastening in the opening.

The solution according to the invention has the advantage that the holding element serves as a fixation for the at least one ultrasonic sensor, if the fluid inside the measuring pipe exerts pressure on the ultrasonic sensor. Furthermore, the holding element is fastened to the measuring pipe in such a way that no screw connections or any similar fixing means are necessary on the measuring pipe itself. This avoids, for example, additional holes or openings in the measuring pipe, which might weaken the measuring pipe under continuous operation.

In a preferred embodiment, the holding element is positioned without pressure on the upper surface of the ultrasonic sensor. In an operating state in which the fluid flowing through the measuring pipe does not exert pressure on the ultrasonic sensor, the holding element is positioned on the at least one ultrasonic sensor without pressure in order to prevent stresses from being transferred to the ultrasonic sensor, wherein said stresses might be created due to the attachment of the holding element to the measuring pipe. However, the holding element ensures that the ultrasonic sensor remains in position when the fluid flowing through the measuring pipe exerts pressure on the ultrasonic sensor.

It is advantageous that the measuring pipe is designed to be thread-free. In particular when using a measuring pipe made of a powder-coated metal, this prevents damage to the powder coating when components are screwed in. This also makes the measuring device suitable for use under humid ambient conditions, since corrosion is avoided.

Usually, the ultrasonic sensors have a flat upper surface. Preferably, in the assembled state, the holding element in cross-section forms a continuous line that has the course of a polygon, in particular a hexagon. This increases the bearing surface between the holding element and the ultrasonic sensor compared to a round cross section of the holding element. As a result, the holding element can exert a comparatively large counterforce when the fluid which flows inside of the measuring pipe exerts pressure on the ultrasonic sensor.

It is particularly advantageous if, in the assembled state, the holding element in cross-section has a symmetrical shape in order to achieve uniform distribution of forces.

Preferably, the measuring pipe has bearing surfaces and the cross-sectional shape of the holding element is complementary to the contour formed from the bearing surfaces on the measuring pipe. The bearing surfaces can be formed from the pipe wall itself, from the upper surface of the ultrasonic sensor and the upper surface of a measuring pipe. Thus, the holding element can be attached to the measuring pipe without clearance or nearly without clearance and still be positioned on the ultrasonic sensor without pressure in the regular operating state, in which the fluid flowing inside the measuring pipe does not exert any pressure on the ultrasonic sensor.

For an easy assembly, it is advantageous that the holding element comprises at least two retaining brackets, wherein the at least two retaining brackets are connectable to each other.

Preferably, the holding element comprises a retaining bracket with at least two retaining sections, with the retaining sections being connected to one another at a predetermined angle in order to be able to adapt the holding element to the geometry of the measuring pipe. Preferably, the retaining bracket is formed as a single piece.

In order to have a comparatively large bearing surface to an ultrasonic sensor with a flat upper surface, it is advantageous that at least one retaining section is plate-shaped. The size, in particular the width, of the retaining section should be matched to the size of the ultrasonic sensor. Preferably, the width of the retaining section is larger than the width of the ultrasonic sensor.

In order to be able to easily connect two holding elements, it is advantageous that at least one retaining section comprises a mounting flange.

A particularly simple mounting of the holding element to the measuring pipe is achieved by the holding element comprising a retaining bracket with three retaining sections formed as a base 35 and two arms, wherein the arms are positioned at opposite ends of the base and face away from the base at a predetermined angle, and wherein a mounting flange is provided at the free end of each arm.

This allows the holding element to be adapted to a given geometry of the measuring pipe and to be connected to each other easily and securely. For example, two holding elements, in which the arms each enclose an angle of 120° with the base, can encompass a measuring pipe with a hexagonal cross-section.

The individual holding elements can be connected to each other by means of screw connections, for example.

In a preferred further development, a passage is provided in at least one retaining section so that further components such as temperature or pressure sensors can be attached to the measuring pipe.

In order to obtain the most clearance-free fastening possible of the holding element on the measuring pipe, each retaining section is assigned a bearing surface on the measuring pipe.

In a preferred embodiment, the pipe wall of the measuring pipe has an outer side which in cross-section has an angular contour and surface sections extending in the axial direction. Thus, bearing surfaces are formed for the at least one ultrasonic sensor and the holding element.

Herein, it is of particular advantage that the measuring pipe comprises at least one surface section of a first type, in which the at least one opening of a first type is provided for receiving the at least one ultrasonic sensor, and said measuring pipe comprises at least one surface section of a second type, on which the holding element is positioned in sections.

In an embodiment in which, for example, physical parameters of the fluid flowing through the measuring pipe, such as temperature or pressure, are measured, it is advantageous that in the pipe wall a measuring sensor having an upper surface and at least one opening of a second type for receiving a measuring sensor are provided, wherein the measuring pipe comprises at least one surface section of a third type on which the measuring sensor is positioned.

The surface section of a third type can be designed in such a way that, in the assembled state, the holding element is positioned on the upper surface of the measuring sensor. Thus, even if a measuring sensor is used, the symmetrical shape of the holding element in cross section can be maintained in order to evenly distribute forces acting on the ultrasonic sensor.

In an embodiment in which a plurality of measuring sensors is used, any second type surface section may be replaced by a third type surface section.

In a preferred further development, a plurality of ultrasonic sensors is provided, wherein any two ultrasonic sensors form a transmitter and receiver pair and are arranged in the axial direction of the measuring pipe, and wherein at least two transmitter and receiver pairs are provided which are arranged along the circumference of the measuring pipe. Providing multiple transmitter and receiver pairs enables increased measurement accuracy as well as measurement reliability, since an error in one transmitter and receiver pair can be detected by comparison with the remaining transmitter and receiver pairs.

BRIEF DESCRIPTION OF THE DRAWINGS

Preferred embodiments are explained in more detail in the accompanying drawings, in which

FIG. 1 shows a measuring device 10 for determining the flow rate of a fluid which flows through a pipe portion in a disassembled state.

Modes for Carrying Out the Invention and Industrial Applicability

The measuring device 10 comprises a measuring pipe 12, which has a pipe wall 14. Pipe flanges 15 are provided at both ends of the measuring pipe 12 in order to be able to install the measuring pipe 12 in an existing pipe system.

The measuring pipe 12 is made of a powder-coated metal, for example. Using other materials such as plastic or uncoated metal is also possible.

Figure 1:
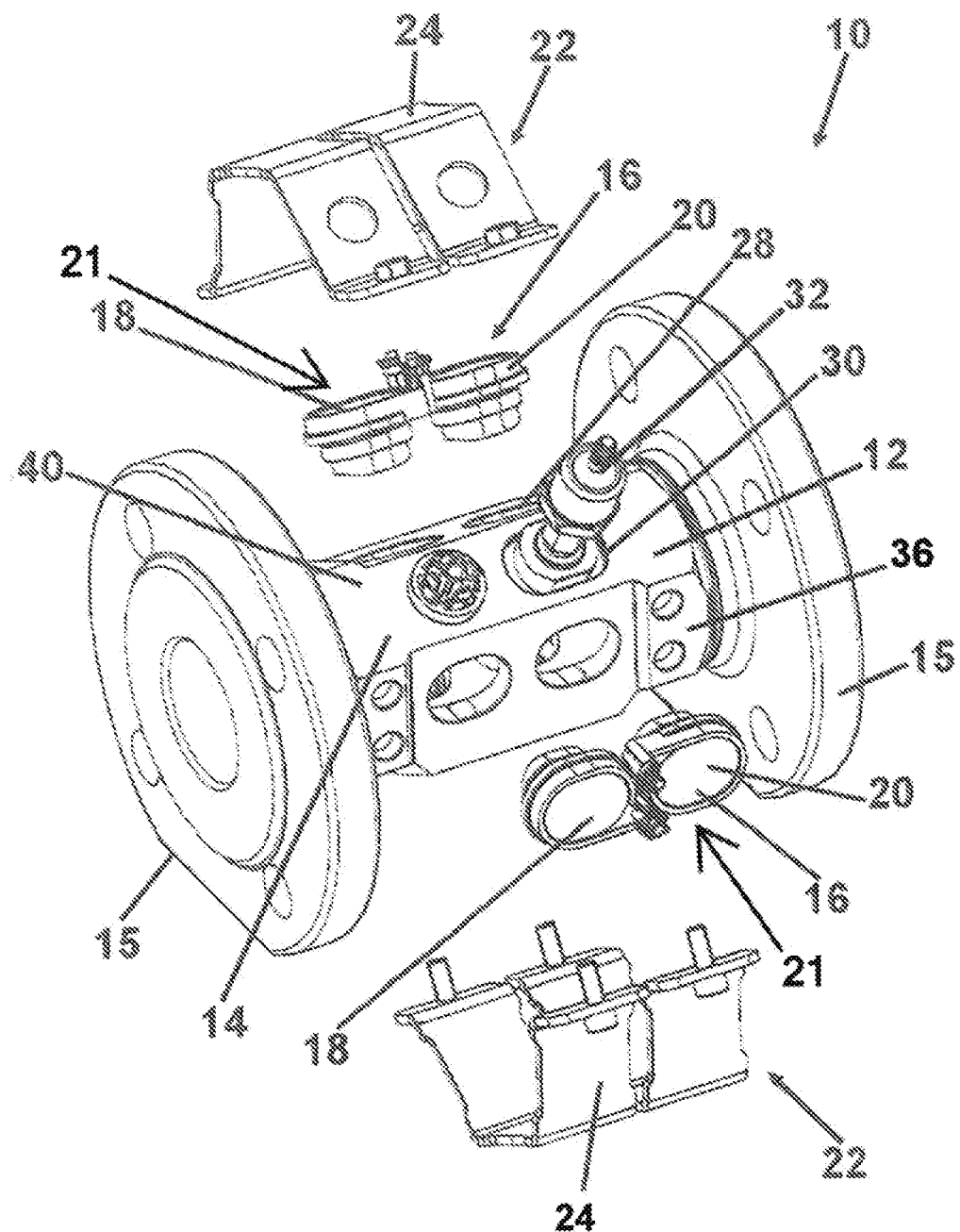
FIG. 1 shows a perspective view of a measuring device in disassembled state.

Furthermore, three pairs of ultrasonic sensors 16 are provided, but only two of them are visible in FIG. 1. Each pair of ultrasonic sensors 16 comprises an ultrasonic sensor 18 for transmitting an acoustic signal and an ultrasonic sensor 20 for receiving an acoustic signal. Each pair of ultrasonic sensors 16 is aligned along the longitudinal axis of the measuring pipe 12. The three pairs of ultrasonic sensors 16 are spaced equidistantly from each other along the circumference of the measuring pipe at a distance of 120°.

In addition, the measuring device 10 comprises a holding element 22 with retaining brackets 24.

Openings of a first type 28 are provided in the pipe wall 14 of the measuring pipe 12 for receiving the ultrasonic sensors 18, 20. Furthermore, openings of a second type 30 are incorporated in the pipe wall 14 to accommodate measuring sensors 32, for example for measuring the temperature and/or the pressure of the fluid which flows through the measuring pipe 12.

Neither the openings of a first type 28 nor the openings of a second type 30 are threaded. Similarly, no threaded openings are provided on the pipe flanges 15.

Figure 2:
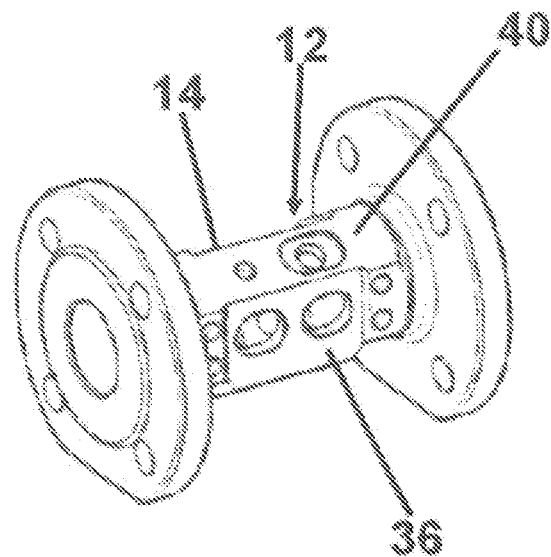
FIG. 2 shows the measuring pipe in perspective view.
Figure 5:
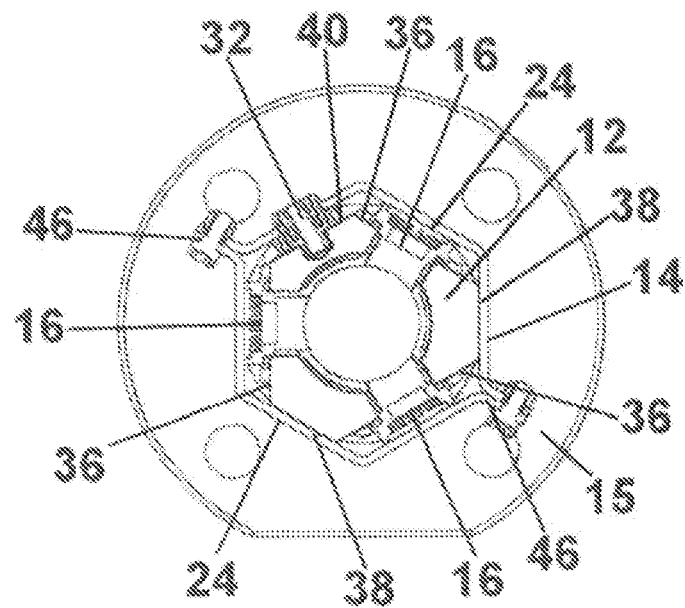
FIG. 5 shows a cross-section through the measuring device in the assembled state and FIG. 6 shows a cross-sectional view of a measuring device for determining the flow rate of a fluid which flows through a pipe portion, in which the use of holding elements is advantageous.

As can be seen in particular in FIGS. 2 and 5, the measuring pipe 12 has a pipe wall 14 with an outer side which shows an angular contour in cross-section. In detail, this is a hexagonal cross-section, with the side lengths of the hexagon being different.

Furthermore, a surface section of a first type 36, a surface section of a second type 38 and a surface section of a third type 40 are provided on the outer side of the measuring pipe 12, each extending in the axial direction. In the surface section of a first type 36, the openings of a first type 28 for the ultrasonic sensors 18, 20 are incorporated. In the surface section of a third type 40, openings of a second type 30 are provided for receiving measuring sensors 32. In the present case, three surface sections of a first type 36 are provided, with a surface section of a second type 38 or a surface section of a third type 40 being arranged between two surface sections of a first type 36.

On the inside, the measuring pipe 12 is round in cross-section.

Figure 3:
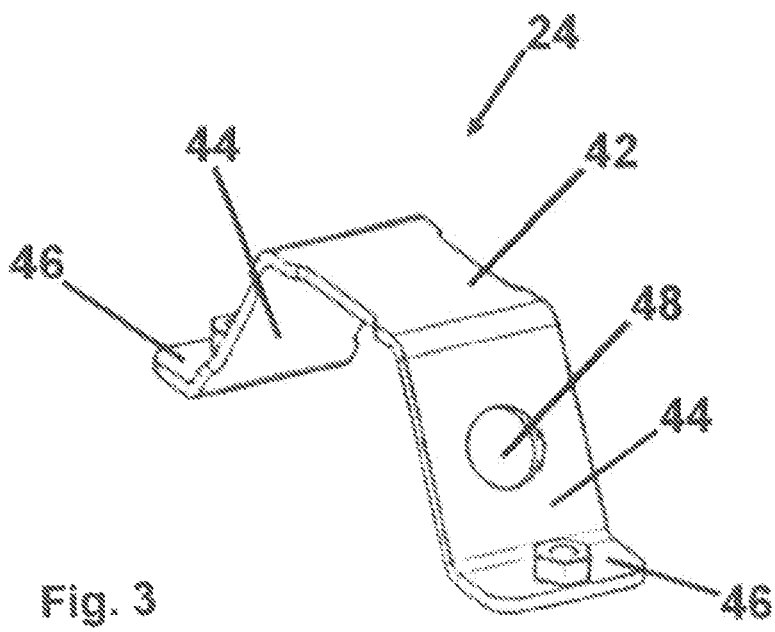
FIG. 3 shows a retaining bracket.

FIG. 3 shows a retaining bracket 24 in perspective view. The retaining bracket 24 comprises three plate-shaped retaining sections forming a base 42 and two arms 44. The arms 44 are positioned at opposite ends of the base 42 and have an angle of 120° with respect to the base 42. A mounting flange 46 is provided at the free ends of each arm 44. The two mounting flanges 46 each face outwardly. A passage 48 for a measuring sensor 32 is incorporated in one arm 44. The retaining brackets 24 are formed as one piece and are preferably bent from a metal element. Alternatively, the retaining brackets 24 may be integrally formed from a plastic or other suitable material.

Figure 4:
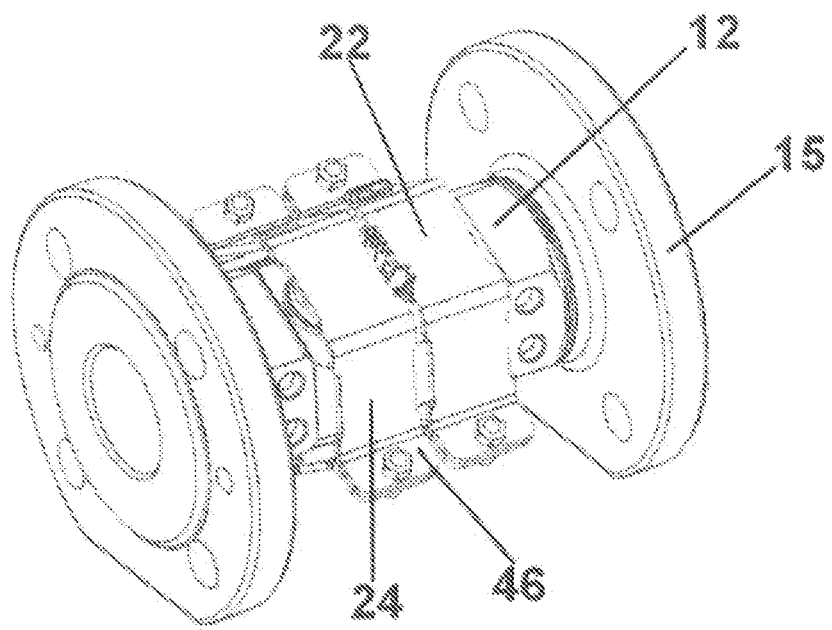
FIG. 4 shows the measuring pipe in the assembled state.

In FIG. 4, the measuring device 10 is shown in an assembled state.

Figure 6:
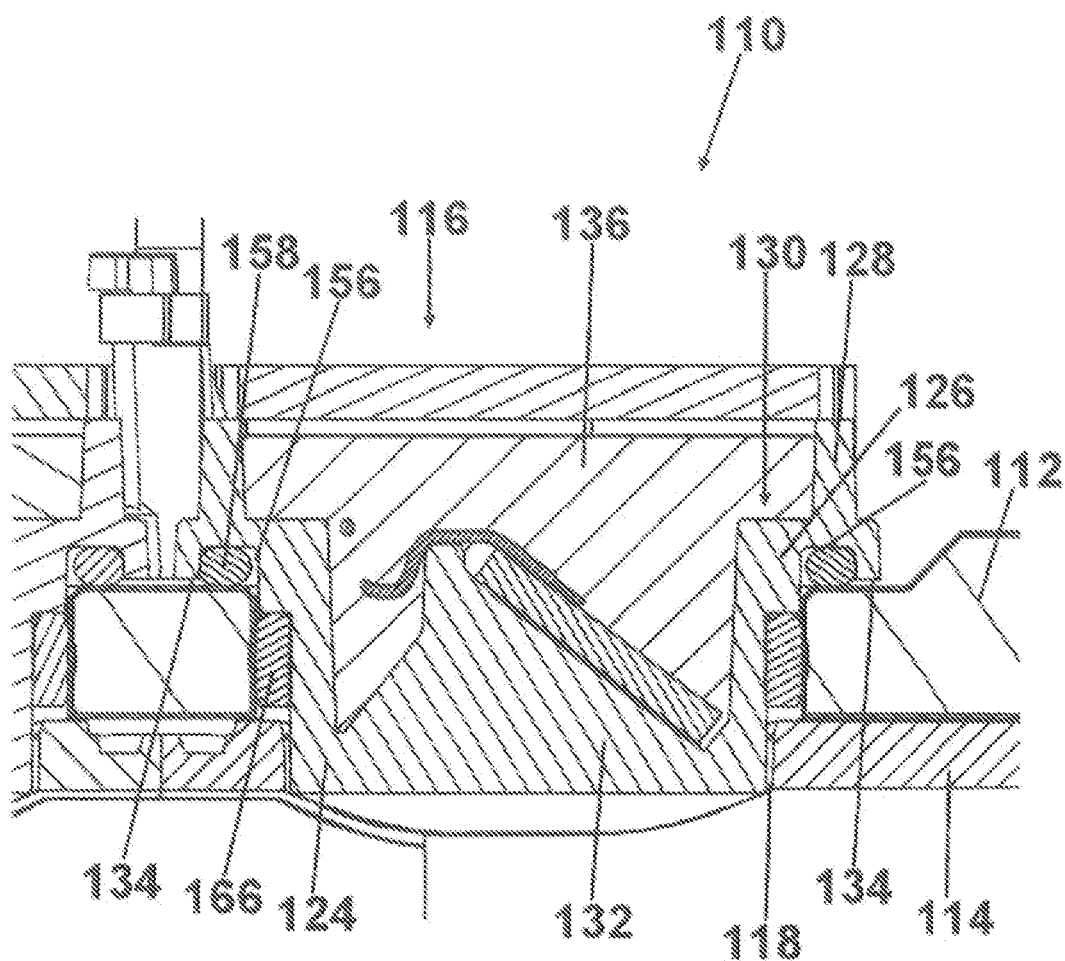

The ultrasonic sensors 18, 20 are inserted in the opening of a first type 28 and are preferably float-mounted. A floating mounting is understood to mean a mounting in which the ultrasonic sensors are arranged in the opening in a fluid-tight manner, but are nevertheless held in the opening with as little friction as possible respectively with only a low clamping force. An example of this is shown in FIG. 6.

Two retaining brackets 24 are connected to each other at their mounting flanges 46 to form a holding element 22. Each holding element 22 forms a type of ring extending along the circumference of the measuring pipe 12. The two holding elements 24 are positioned side by side and spaced apart from each other on the measuring pipe 12, wherein each holding element 24 covers at least one ultrasonic sensor 18, 20.

Since the ultrasonic pairs 16 are located along a common circumferential line on the measuring pipe 12, two holding elements 22 are sufficient to fixate the ultrasonic sensors 18, 20 on the measuring pipe 12.

Only the retaining brackets 24 are connected to each other. There is no firm connection to the measuring pipe 12. Thus, no holes or holding means are necessary on the measuring pipe 12 to fasten the holding element 22 on the measuring pipe 12. The holding element 24 is fixated on the measuring pipe 12 by the angular geometry of the measuring pipe 12 and the holding element 22, and by providing the measuring sensor 32 in the measuring pipe 12, wherein the angular geometry of the measuring pipe 12 and the holding element 22 is sufficient to securely fixate the holding element 22 on the measuring pipe 12.

FIG. 5 shows a cross-section through the assembled measuring device 10. In cross-section, the two holding elements 22 have the shape of a hexagon. The hexagon is symmetrical, in particular regular with equal side lengths.

In the embodiment shown, a measuring sensor 32 is provided. Since said measuring sensor projects through the opening in a holding element 22, the measuring sensor 32 determines the alignment of the holding element 22 on the measuring pipe 12. The arm 44 with the passage 48 for the measuring sensor 32 is to be positioned at the surface section of a third type 40. Thus, the remaining arms and base sections are positioned on the remaining surface sections in the order specified by the holding element 22.

Herein, the holding element 22 is positioned on the upper surface 21 of each ultrasonic sensor 18, 20 without pressure, while the holding element 22 is positioned directly on the surface section of a second type 38. In the area of the surface section of a third type 40, the holding element is positioned on the upper surface of the measuring sensor 32. In this embodiment, the upper surface of each ultrasonic sensor 18, 20, the surface section of a second type 38 and the upper surface of the measuring sensor 32 thus form the bearing surfaces for the holding element 22.

In the operating state, a fluid flows through the measuring pipe. In the event that the pressure inside the measuring pipe 12 increases so that the ultrasonic sensors 18, 20 are pushed out of their position, the holding element 22 exerts a counterforce respectively prevents the ultrasonic sensor 18, 20 from moving out of its position. If multiple ultrasonic pairs 16 are provided distributed around the circumference, the symmetrical design of the holding element 22 ensures that each ultrasonic sensor 18, 20 is securely held in position.

The holding element 22 is made of a material with a low thermal expansion coefficient in order to securely hold the ultrasonic sensors 18, 20 on the measuring pipe 12 even under fluctuating ambient temperatures even if the fluid which flows inside the measuring pipe 12 exerts a high pressure on the ultrasonic sensor 18, 20.

Furthermore, it is advantageous that the bearing surfaces of a first type 36 and the bearing surfaces of a second type 38 or third type 40 are provided alternately along the circumference of the measuring pipe 12 in order to prevent pressure loading of individual ultrasonic sensors 18, 20 in the event of internal pressure created by the fluid.

In an embodiment not shown, the holding element can also have a basic shape other than hexagonal. Thus, the invention can also be used with measuring pipes that are round or have an angular geometry other than the one described so far. The shape of the cross-section of the holding element must then be adapted to the round or angular geometry of the measuring pipe. Herein, holding elements that have no base, angled arms or combinations of base, straight arms and angled arms can also be used. Additionally or alternatively, more than two holding elements can be connected to each other.

If possible, each retaining bracket portion of a holding element should be positioned closely on an upper surface of the measuring pipe. The upper surface of the measuring pipe can be formed by a surface section of the measuring pipe, by an upper surface of the ultrasonic sensor, or by a surface of the measuring sensor.

However, particularly advantageous are embodiments in which the holding element is symmetrical in cross-section and in which the ultrasonic sensors are arranged equidistantly around the measuring pipe.

In case the use of measuring sensors 32 is not necessary, the surface of a third type 40 can be replaced by a surface of a second type 38.

FIG. 6 shows a cross-section of a measuring device 110 for determining the flow rate of a fluid which flows through a pipe portion, in which the use of the holding elements 22 is of particular advantage.

FIG. 6 shows an ultrasonic sensor arrangement 116 in a measuring pipe 112 having an inner pipe 114. The outer wall of the measuring pipe 112 corresponds to the outer wall of the measuring pipe as shown in FIGS. 1 to 5, so that the measuring pipe 112 has an opening 118 in which an ultrasonic sensor arrangement 116 is positioned. The opening 118 of the measuring pipe 112 is threadless, so that the ultrasonic sensor arrangement is plugged into the opening 118 of the measuring pipe 112.

The ultrasonic sensor arrangement 116 comprises a housing 124 with a container 126 and a circumferential edge 128, with the container 126 having an open upper side 130 and the circumferential edge 128 being integrally formed on the container 126 at the top 130 of the container 126 in an outwardly offset manner. Further, a wedge-shaped coupling element 132 is provided on which a piezoelectric element is arranged. The housing 124 is filled with a potting compound 136, such that the ultrasonic sensor arrangement 116 is constructed in a fluid-tight manner.

An accommodation 156 for a tolerance compensation element 158 is provided on the underside 134 of the circumferential edge 128. The accommodation 156 for the tolerance compensation element 158 extends as an annular groove along the outer circumference of the outwardly offset circumferential edge 128. The tolerance compensation element 158 is designed as an elastic ring-shaped band.

The circumferential edge 128 is positioned on the measuring pipe 112 by means of the tolerance compensation element 158. The tolerance compensation element 158 is received In the accommodation 156 which is designed as a groove, wherein the tolerance compensation element 158 has a larger diameter than the depth of the groove such that the tolerance compensation element 158 protrudes outward beyond the underside 134 of the circumferential edge 128. The underside of the circumferential edge is arranged with clearance respectively with a small distance above the measuring pipe, while the tolerance compensation element 158 is positioned directly on the measuring pipe 112 and forms a clearance-free connection. As a result, the ultrasonic sensor arrangement 116 is held in the opening 118 of the measuring pipe 112 essentially without pressure or force, even in the case of measuring pipes with manufacturing-related dimensional tolerances.

A sealing ring 166 is provided between the housing 124 and the measuring pipe 112 in the opening 118, and said sealing ring 166 is positioned below a protrusion 160 on the exterior of the housing. The sealing ring 166 ensures that there is a fluid-tight connection between the measuring pipe 112 and the ultrasonic sensor arrangement 116.

The underside of the housing 124 is adapted to the geometry of the measuring pipe 112 and the inner pipe 114, such that the ultrasonic sensor arrangement 116 in the interior of the measuring pipe 112 is arranged so as to be flush with the inner wall of the inner pipe 114.

In the illustrated embodiment, the ultrasonic sensor arrangement 116 is installed in a measuring pipe 112 without clearance and substantially without pressure or force. To prevent the ultrasonic sensor arrangement 116 from being pushed outward by a pressurized fluid in the measuring pipe, holding elements 22 can be arranged outside the measuring pipe 112 as described in FIGS. 1 to 5.

The invention claimed is:

1. A measuring device for determining the flow rate of a fluid which flows through a pipe portion, comprising a measuring pipe (12; 112) with a pipe wall (14), at least one ultrasonic sensor (18, 20; 116) for transmitting an acoustic signal and/or receiving an acoustic signal having an ultrasonic sensor upper surface (21), and a holding element (22), wherein in the pipe wall (14), at least one opening of a first type (28; 118) is provided into which the at least one ultrasonic sensor (18, 20; 116) can be inserted, and wherein the measuring device (10; 110) has an assembled state in which the holding element (22) surrounds the measuring pipe (12; 112) in an annular manner and is positioned on the outside of the at least one ultrasonic sensor (18, 20; 116) inserted in the opening of a first type (28; 118), wherein the holding element (22) serves as a fixation for the at least one ultrasonic sensor (18, 20; 116) when the fluid flowing inside the measuring pipe (12; 112) exerts pressure on the ultrasonic sensor (18, 20; 116), and wherein in an operating state in which the fluid flowing through the measuring pipe (12; 112) does not exert any pressure on the ultrasonic sensor (18, 20; 116), the holding element (22) is positioned without pressure on the upper surface (21) of the ultrasonic sensor (18, 20; 116).

2. The measuring device according to claim 1, characterized in that the holding element (22) is positioned without pressure on the upper surface of the at least one ultrasonic sensor.

3. The measuring device according to claim 1, characterized in that the measuring pipe 2; 112) is thread-free.

4. The measuring device according to claim 1, characterized in that, in the assembled state, the holding element (22) in cross-section forms a continuous line which has the shape of a polygon.

5. The measuring device according to claim 4, wherein the shape of the polygon is a hexagon.

6. The measuring device according to claim 1, characterized in that, in the assembled state, the holding element (22) in cross-section has a symmetrical shape.

7. The measuring device according to claim 1, characterized in that the measuring pipe has bearing surfaces and the cross-sectional shape of the holding element (22) is complementary to the contour formed from the bearing surfaces on the measuring pipe (12).

8. The measuring device according to claim 1, characterized in that the holding element (22) comprises at least two retaining brackets (24), wherein at least two retaining brackets (24) are connectable to each other.

9. The measuring device according to claim 1, characterized in that the holding element comprises a retaining bracket with at least two retaining sections, with the retaining sections being connected to one another at a predetermined angle.

10. The measuring device according to claim 9, characterized in that at least one retaining section of the retaining bracket with at least two retaining sections is plate-shaped.

11. The measuring device according to claim 9, characterized in that at least one retaining section of the retaining bracket with at least two retaining sections comprises a mounting flange.

12. The measuring device according to claim 9, characterized in that the holding element (22) comprises a retaining bracket (24) with three retaining sections formed as a base (42) and two arms, wherein the arms (44) are positioned at opposite ends of the base (42) and face away from the base (42) at a predetermined angle, and wherein a mounting flange (46) is provided at a free end of each arm (44).

13. The measuring device according to claim 9, characterized in that a passage (48) is provided in at least one retaining section of the retaining bracket with at least two retaining sections.

14. The measuring device according to claim 9, characterized in that the measuring pipe has bearing surfaces and each retaining section is assigned a bearing surface on the measuring pipe (12).

15. The measuring device according to claim 1, characterized in that the pipe wall (14) of the measuring pipe (12; 112) has an outer side which in cross-section has an angular contour and surface sections extending in the axial direction.

16. The measuring device according to claim 1, characterized in that the measuring pipe (12; 112) comprises at least one surface section of a first type (36), in which the at least one opening of a first type (28; 116) is provided for receiving the at least one ultrasonic sensor (18, 20; 116), and that said measuring pipe (12; 112) comprises at least one surface section of a second type (38), on which the holding element (22) is positioned in sections.

17. The measuring device according to claim 16, characterized in that in the pipe wall (114) a measuring sensor 32) having an upper surface (33) and at least one opening of a second type (30) for receiving the measuring sensor (32) are provided, wherein the measuring pipe (12; 112) comprises at least one surface section of a third type (40) on which the measuring sensor (32) is positioned.

18. The measuring device according to claim 1, characterized in that a plurality of ultrasonic sensors (18, 20; 116) is provided, wherein any two ultrasonic sensors (18, 20; 16) form a transmitter and receiver pair (16) and are arranged in the axial direction of the measuring pipe (12; 112), and wherein at least two transmitter and receiver pairs (16) are provided which are arranged along the circumference of the measuring pipe (12; 112).

* * * * *